United States Patent [19]

Sasaki et al.

[11] Patent Number: 4,775,783

[45] Date of Patent: Oct. 4, 1988

[54] TRANSACTION SYSTEM

[75] Inventors: Shigeru Sasaki, Ibaraki; Masataka Kawauchi, Ishioka; Yasunori Hamada, Tsuchiura; Masao Okayama, Ryugasaki; Yoshiharu Takahashi, Kasugai, all of Japan

[73] Assignee: Hitachi, Ltd., Tokyo, Japan

[21] Appl. No.: 890,609

[22] Filed: Jul. 30, 1986

[30] Foreign Application Priority Data

| | | | |
|---|---|---|---|
| Aug. 2, 1985 | [JP] | Japan | 60-169802 |
| May 23, 1986 | [JP] | Japan | 61-117331 |
| May 23, 1986 | [JP] | Japan | 61-117332 |
| May 23, 1986 | [JP] | Japan | 61-117333 |

[51] Int. Cl.[4] .......... G06F 15/30

[52] U.S. Cl. .......... 235/379

[58] Field of Search .......... 235/379, 384, 383

[56] References Cited

FOREIGN PATENT DOCUMENTS

| | | | |
|---|---|---|---|
| 241161 | 11/1985 | Japan | 235/379 |
| 241163 | 11/1985 | Japan | 235/379 |
| 241165 | 11/1985 | Japan | 235/379 |

*Primary Examiner*—Roy N. Envall, Jr.

*Attorney, Agent, or Firm*—Antonelli, Terry & Wands

[57] ABSTRACT

A transaction system comprises a plurality of transaction machines capable of accepting deposits and paying out bills and a bill supplying/retrieving device which operates in conjunction with the transaction machines for supplying and retrieving bills to and from the transaction machines wherein the bill supplying/retrieving device is movable by a driving device.

12 Claims, 11 Drawing Sheets

TRANSACTION SYSTEM

BACKGROUND OF THE INVENTION

The present invention relates to a transaction system incorporating a plurality of transaction machines which are capable of accepting deposits from and paying out money to a customer, and more particularly, to a transaction system in which bills are circulated among a plurality of transaction machines constituting a transaction system to be used for payment.

Various automatic machines have been used in a bank in order to rationalize its counter transactions and improve customer service, such automatic machines including, for example, automated teller machnne disclosed in the specification of U.S. Pat. No. 4,511,133 which is capable of automatically accepting deposits from and paying out money to a customer.

The known cash handling devices described above are intended to rationalize the counter transactions and improve the customer service in a bank. Apart from the bank counter, there is a cash corner in a bank in which automated teller machines are installed. Such machines are directly operated by customers to transact business with the bank. Customers usually form a line in front of the machines of this type and wait for their turn. It is therefore unsatisfactory from the point of view if customer service of transactions through the machines have to be suspended due to a shortage of funds contained in the machines, and the customers kept waiting further.

SUMMARY OF THE INVENTION

In view of the above described facts, an object of the present invention is to provide a transaction system in which bills can be supplied to and retrieved from cash transaction machines installed in a cash corner or the like so that transactions are not suspended at the cash transaction machines.

The object of the present invention is achieved by providing a transaction system comprising: a plurality of transaction machines; and a bill supplying/retrieving means for supplying and retrieving bills to and from the transaction machines, the bill supplying/retrieving means being mounted at the rear of the transaction machines in such a manner that it can be moved by a moving means.

The bill supplying/retrieving means mounted at the rear of the plurality of transaction machines is designed to move to a transaction machine which has become full of bills on receipt of a signal therefrom, and retrieve the bills from that transaction machine. The bill supplying-/retrieving means, when any transaction machine becomes short of bills, moves to that transaction machine, and supplies it with bills.

The above and other objects, features and advantages of the invention will become clear from the following description of the preferred embodiments taken in conjunction with the accompanying drawings.

DETAILED DESCRIPTION OF THE PREFERRED EMBODIMENTS

Embodiments of the present invention will be described below with reference to the accompanying drawings.

Figure 1:
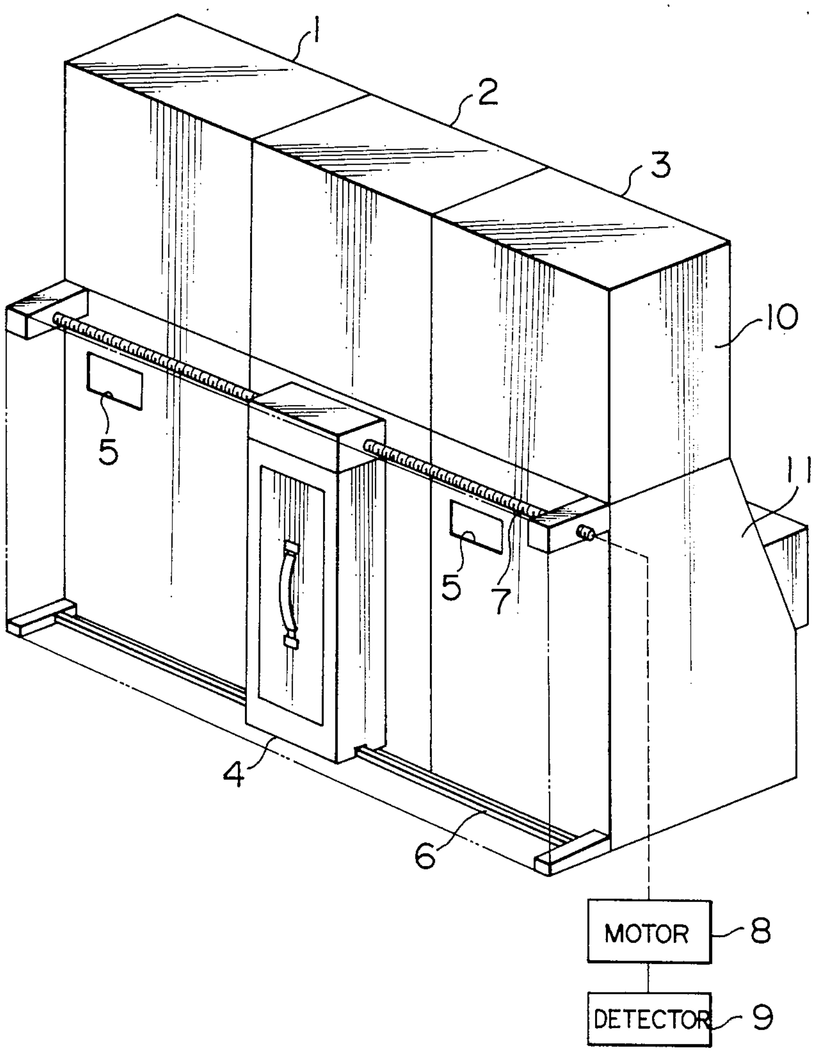
FIG. 1 is a perspective view of a first embodiment of the transaction system according to the present invention.

Referring first to FIG. 1 which shows the construction of a first embodiment of a transaction system of the present invention, reference numbers 1 to 3 respectively denote automatic transaction machines installed at a cash corner or the like and arranged side by side. A bill supplying/retrieving means 4 is mounted at the rear side of the transaction machines 1 to 3 in such a manner that it can be moved therealong. The bill supplying/retrieving means 4 is adapted to supply to and retrieve from any of the transaction machines 1 to 3 bills through a port 5 provided at the rear side of each of the transaction machines 1 to 3. The bill supplying/retrieving means 4 moves along the rear side of the transaction machines 1 to 3 by the guidance of a guide rail 6 mounted at the bottom of the rear side of the transaction machines 1 to 3 and by the engagement with a screw shaft 7 mounted at the upper portion thereof. A motor 8 is coupled to the screw shaft 7. The motor 8 is connected at the other end thereof to a detector 9 for detecting the position of the bill supplying/retrieving means 4.

Figure 2:
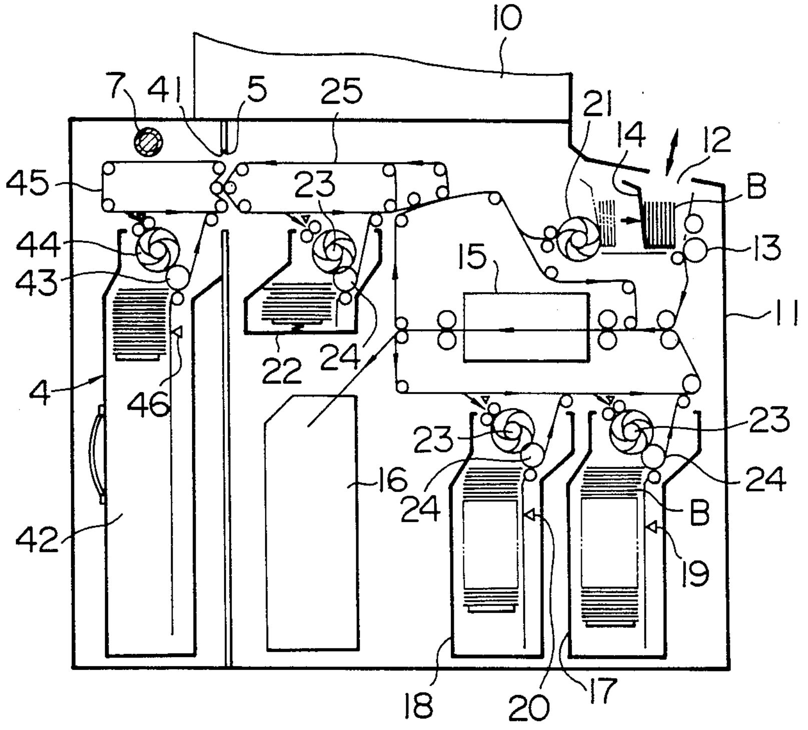
FIG. 2 is a vertical cross-sectional view of the transaction system of FIG. 1.

FIG. 2 illustrates how the transaction machines 1 to 3 and the bill supplying/retrieving means 4 are constructed. The transaction machines 1 to 3 are each composed of a slip issuing and passbook printing section 10 and a bill handling section 11. The bill handling section 11 has at its front side a port 12 through which cash is received and paid out. The bill handling section 11 further includes at one side of the port 12 a separating feeder 13 for accepting deposited bills B and at the other side thereof a pushing portion 14 for forcing out bills B to be paid to the port 12. At the center of the bill handling section 11 is a bill checker 15 which determines whether bills B which have been received or will be paid out are valid or not. The bill handling section 11 also contains at the rear of bill checker 15 a reject box 16 for retrieving the indiscriminatable bills B. In front of the reject box 16 are a first bill box 17 and a second bill box 18 which contain bills to be circulated. The bill boxes 17 and 18 are respectively provided with sensors 19 and 20 for detecting the residual quantities of bills contained in the individual boxes. The pushing portion 14 has a stacker 21. A pre-stacker 22 for temporarily storing the bills B which have been taken in is disposed above the reject box 16. The pre-stacker 22, the first bill box 17 and the second bill box 18 each have at their upper portions a stacker 23 and a separating feeder 24. The components described above are interconnected through a conveying means which has a gate at the branch portion thereof. Above the pre-stacker 22 is provided a conveying means 25 which is connected but independently provided to and from the conveying means and which faces the port 5.

The bill supplying/retrieving means 4 is constructed with a port 41 which faces the ports 5 of the transaction machines 1 to 3, a bill accommodating portion 42, a separating feeder 43 and a stacker 44 which are mounted at the upper portion of the accommodating portion 42, and a conveying means 45 mounted between these devices 43 and 44 and the port 41. The conveying means 45 is adapted to meet with the end of the conveying means 25 of each of the transaction machines 1 to 3 at one end thereof which is adjacent to the port 41. The bill accommodating portion 42 has a sensor 46 for detecting the quantity of bills which have been accommodated therein.

Figure 3:
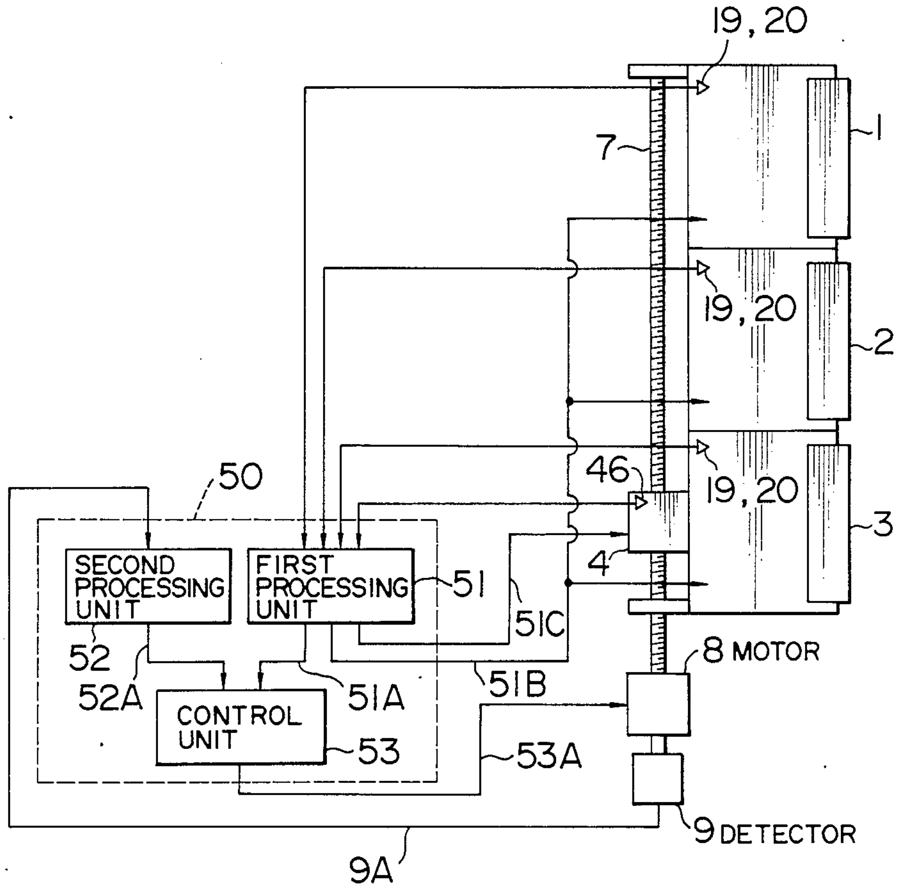
FIG. 3 shows an example of a control circuit employed in the transaction system according to the present invention.

FIG. 3 shows how a control device employed in the transaction system of the present invention is constructed. In the Figure, the same reference numerals are used to denote the same parts as those in FIGS. 2 and 3. The control device 50 is composed of: a first processing unit 51 which, on the basis of the signals sent from the sensors 19 and 20 of any of the transaction machines 1 to 3 and the sensor 46 of the bill supplying/retrieving means 4, computes a target position command 51A for the bill supplying/retrieving means 4, a supply/retrieval operation command 51B and a drive command 51C by which the bill supplying/retrieving means 4 supplies or retrieves bills to and from the relevant transaction machine; a second processing unit 52 which computes and outputs a current position command 52A for the bill supplying/retrieving means 4 on the basis of a signal 9A from the detector 9; and a control unit 53 which outputs a motor control signal 53A to the motor 8 to move the bill supplying/retrieving means 4 to a target transaction machine by means of the target position command 51A for the bill supplying/retrieving means 4 which has been output by the first processing unit 51 and the current position command 52A for the bill supplying/retrieving means 4 which has been output by the second processing unit 52.

Operation of the thus-arranged transaction system of the present invention will be hereinafter described.

In deposit accepting transactions conducted by each of the transaction machines 1 to 3, the bills B which have been inserted into the port 12 by a customer is temporarily stored in the pre-stacker 22, and are classified by the type of bill and accommodated in the first and/or second bill boxes 17 and 18. The bills B which are accommodated in the first and/or second bill boxes are discharged to the port 12 when requested by a customer in paying transactions.

Assume that deposit accepting transactions are frequently conducted by customers at, for example, the transaction machine 1 and that bills B are accommodated in the bill boxes 17 and 18 of the transaction machine 1 in an amount which is more than the predetermined value. The quantities of bills B are detected by the sensors 19 and 20, and the detecting signals are input into the first processing unit 51. The first processing unit 51, on the basis of these signals, computes the target position command 51A for the bill supplying/retrieving means 4 and the bill supplying/retrieval operation command 51B. In the meantime, the second processing unit 52 computes the current position command 52A for the bill supplying/retrieving means 4 on the basis of the detecting signal 9A sent from the detector 9, and outputs the result to the control unit 53. The control unit 53 outputs, in accordance with the current position command 52A and the target position command 51A, the motor control signal 53A to the motor 8 to move the bill supplying/retrieving means 4 to the transaction machine 1. In consequence, the screw shaft 7 is rotated by the motor 8 to position the bill supplying/retrieving means 4 to the transaction machine 1. The first processing unit 51 then outputs the bill retrieval operation command 51B to the bill supplying/retrieving means 4 and drives it to retrieve the bills, while outputting to the transaction machine 1 a command to discharge the bills to the bill supplying/retrieving means 4. As a result, the bills contained in the bill boxes 17 and 18 of the transaction machine 1, after having been separated by its separating feeder 24 and the type and the number of the bills having been checked by the bill checker 15, are conveyed through the conveying means 25 of the transaction machine 1 to the conveying means 45 of the bill supplying/retrieving means 4, and are then accommodated in the bill accommodating portion 42 by the stacker 44. The thus-retrieved bills B can be caused to flow back to a transaction machine which is short of bills B.

When any one of the transaction machines 1 to 3 has insufficient bills, the bill supplying/retrieving means 4 is positioned to the relevant transaction machine, and is then driven to supply bills while the relevant transaction machine is driven to receive bills. As a result, the required number of bills B are separated by the separating feeder 43 of the supplying/retrieving means 4 and are supplied to the conveying means 25 of the relevant transaction machine through the conveying means 45. The bills are then sent to the bill checker 15 directly so that the type and the number thereof are checked without being passed through the pre-stacker 22, and accommodated in the bill boxes 17 and 18, thereby completing the supply of bills to the transaction machine.

By virtue of the fact that the bills B are supplied and retrieved in the manner as described above, a plurality of transaction machines can be group controlled, and the efficiency of the use of funds by these transaction machines can be increased. It is also possible to reduce the frequency of occurrence of transaction suspensions by using funds in the manner described above.

Figure 4:
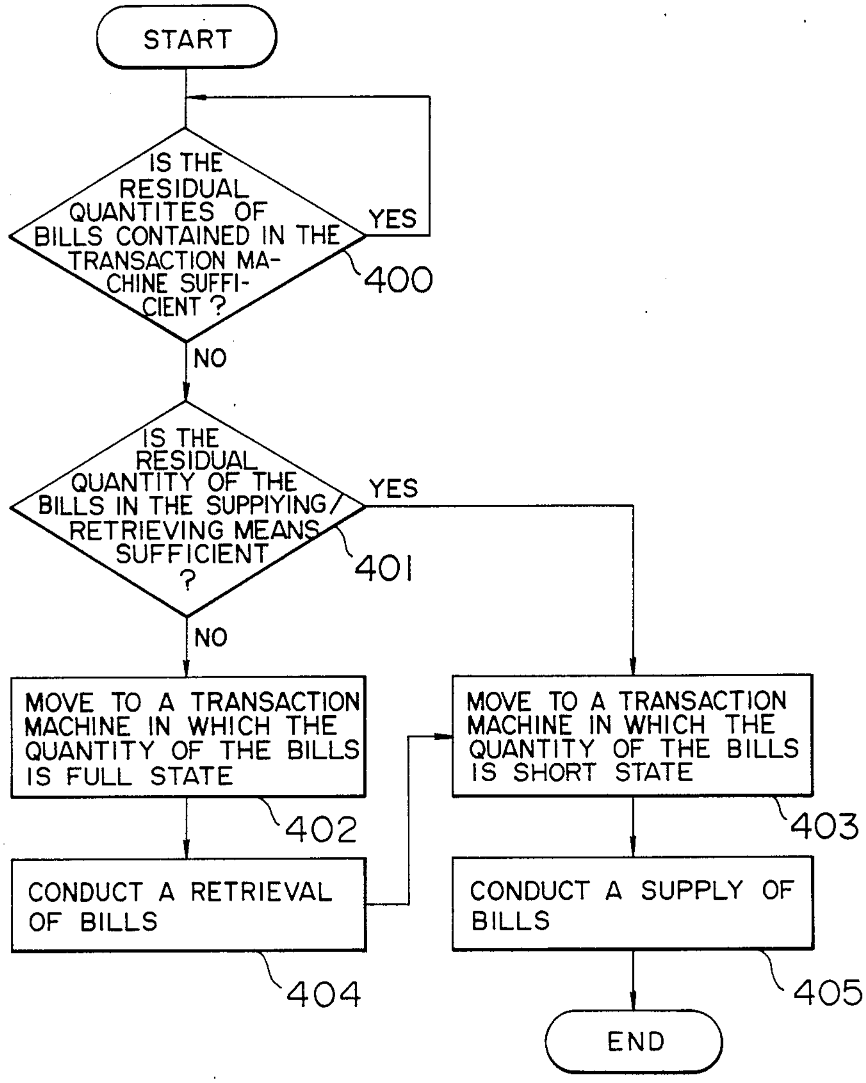
FIG. 4 is a flowchart diagram of the process carried out in the present invention.

In the embodiment described above, the control device 50 may be constituted by a microcomputer. FIG. 4 shows the flowchart diagram of the process conducted in that case. As shown in FIG. 4, the residual quantities of bills contained in the transaction machines 1 to 3 are checked in step 400. The residual quantity of the bills in the bill supplying/retrieving means 4 is then checked in step 401. Thereafter, the procedure goes to step 402 or 403 in which, on the basis of the residual quantities checked, the bill supplying/retrieving means 4 is moved to a relevant transaction machine. Supply or retrieval of bills is then conducted in steps 404 and 405.

The transaction machines employed in the abovedescribed embodiment have the functions of accepting deposits and paying out money. The present invention can also be applied to a combination of transaction machines of this type and ones capable of either accepting deposits or paying out money. Further, the moving means of the bill supplying/retrieving means 4 is not limited to the screw shaft. The motor 8 may be mounted in the bill supplying/retrieving means 4.

Thus, according to the first embodiment of the present invention, it is possible to use funds more efficiently among a plurality of transaction machines installed in a cash corner or the like.

Figure 5:
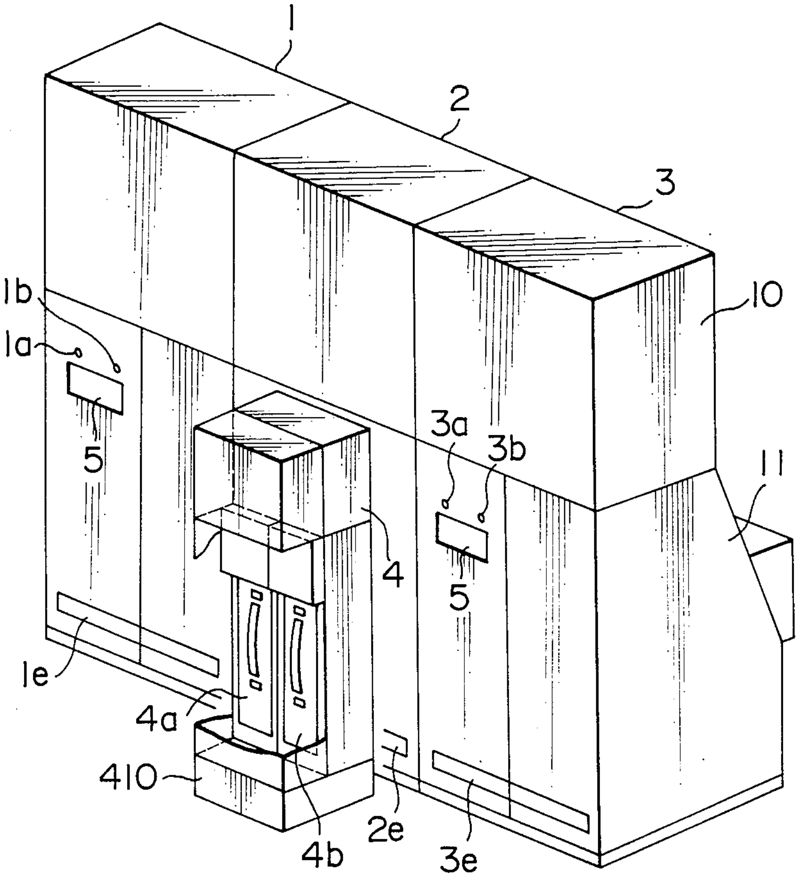
FIG. 5 is a perspective view of a second embodiment of a transaction system according to the present invention.

Referring to FIG. 5 which shows a construction of a second embodiment of the transaction system of the present invention, reference numerals 1 to 3 respectively denote transaction machines installed at a cash corner or the like and arranged side by side. A bill supplying/retrieving means 4 is mounted at the rear side of the transaction machines 1 to 3 in such a manner that it can be moved therealong. The bill supplying/retrieving means 4 has a self-propelling portion 410. The bill supplying/retrieving means 4 is adapted to supply to and retrieve from any of the transaction machines 1 to 3 bills through a port 5 mounted on the rear side of each of the transaction machines 1 to 3. The bill supplying/retrieving means 4 moves on the floor of the rear side of the transaction machines 1 to 3 by means of the self-propelling means to be described later. The transaction machines have sensors 1*a*, 1*b*, 2*a*, 2*b*, 3*a* and 3*b* (2*a* and 2*b* not shown), respectively, which determine the position at which the bill supplying/retrieving means 4 is stopped.

Figure 6:
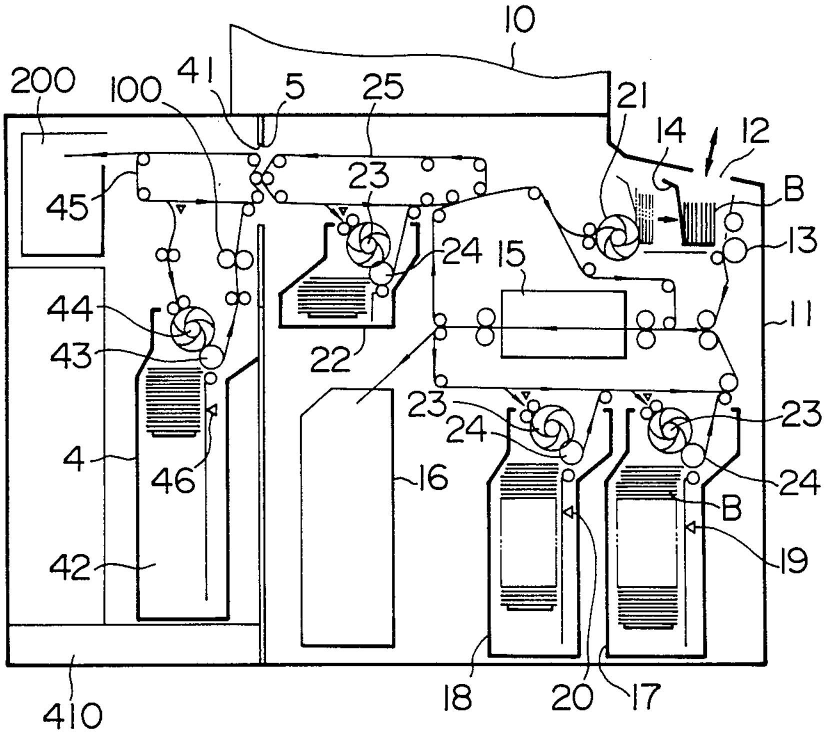
FIG. 6 is a vertical cross-sectional view of the transaction system of FIG. 5.

FIG. 6 illustrates how the transaction machines 1 to 3 and the bill supplying/retrieving means 4 are constructed. The transaction machines 1 to 3 are each composed of a slip issuing and passbook printing section 10 and a bill handling section 11. The bill handling section 11 has at its front side a port 12 through which cash is received and paid out. The bill handling section 11 further includes at one side of the port 12 a separating feeder 13 for accepting deposited bills B and at the other side of the port 12 a pushing portion 14 for forcing out bills B to be paid to the port 12. At the center of the bill handling section 11 is a bill checker 15 which determines whether bills B which have been received or will be paid out are valid or not. The bill handling section 11 also contains at the rear of the bill checker 15 a reject box 16 for retrieving the indiscriminatable bills B. In front of the reject box 16 are a first bill box 17 and a second bill box 18 which contain bills to be circulated. The bill boxes 17 and 18 respectively have sensors 19 and 20 for detecting the residual quantities of bills contained in the individual boxes. The pushing portion 14 has a stacker 21. A pre-stacker 22 for temporarily storing the received bills B is disposed above the reject box 16. The pre-stacker 22, the first bill box 17 and the second bill box 18 each have at their upper portions a stacker 23 and a separating feeder 24. The components described above are connected with each other through a conveying means which is provided with a gate at the branch portion thereof. Above the pre-stacker 22 is another conveying means 25 which is connected to the first-mentioned conveying means and which faces the port 5.

The bill supplying/retrieving means 4 is constructed with a port 41 which faces the ports 5 of the transaction machines 1 to 3, a bill accommodating portion 42, a separating feeder 43 and a stacker 44 which are mounted at the upper portion of the accommodating portion 42, and a conveying means 45 mounted between these devices 43 and 44 and the port 41. The conveying means 45 is adapted to meet up with the end of the conveying means 25 of each of the transaction machines 1 to 3 at one end thereof which is adjacent to the port 41. The bill accommodating portion 42 has a sensor 46 for detecting the quantity of bills contained therein. The accommodating portion 42 of the bill supplying/retrieving means 4 is constituted by cash boxes for two types of bills, an one thousand yen bill and a ten thousand yen bill. The cash boxes each have a port 41 through which bills are conveyed and which faces the ports 5 of the transaction machines 1 to 3. The ports 41 are respectively provided at their upper portions with sensors 4*c*, 4*d* and 4*e*, 4*f* (not shown) for detecting the position at which the bill supplying/retrieving means 4 is stopped. The bill supplying/retrieving means 4 further contains a double-bill detector 100 located above the separating feeder 43, a reject box 200 located at the left side of the conveying means 45 as viewed in FIG. 6, and the drive portion 410 located at the bottom thereof by which the bill supplying/retrieving means 4 travels by itself on the floor.

Operation of the thus-arranged second embodiment of the present invention will be hereinafter described.

One of the transaction machines 1 to 3 functions as a general machine, and controls other transaction machines and the bill supplying/retrieving means 4.

The transaction machines 1 to 3 are each adapted to receive bills B inserted into the port 12 by a customer, temporarily store them in the pre-stacker 22, classify them by the type of the bill, and accommodate them in the first and second bill boxes 17 and 18. The transaction machines 1 to 3 are also capable of discharging to the port 12 the bills B which have been accommodated in the first and second bill boxes 17 and 18 when requested by a customer.

Assume that deposit accepting transactions are frequently conducted by customers at, for example, the transaction machine 1 and that bills B are accommodated in the bill boxes 17 and 18 of the transaction machine 1 in an amount which is more than the predetermined value. The quantities of bills B are detected by the sensors 19 and 20, and the detecting signals are outputted to the transaction machine acting as a general machine. The general machine, on the basis of these signals, outputs a target position command to the bill supplying/retrieving means 4. If this is different from the last position command which the bill supplying/retrieving means 4 obeyed, the bill supplying/retrieving means 4 starts moving along the rear side of the transaction machines. The sensors for stopping the bill supplying/retrieving means 4 are selected by the new target position command, and the bill supplying/retrieving means 4 stops at a position where the selected sensors are turned on. For example, the bill supplying/retrieving means 4 with bill boxes for one thousand yen and ten thousand yen bills, starts moving from the position of FIG. 5, and stops, if the type of the bills of which amount is detected to be more than a predetermined amount is ten thousand yen bills, at a position where the sensors 4c and 4d are turned on. Similarly, the moving bill supplying/retrieving means 4 stops at a position where the sensors 4e and 4f are turned on, if the type of detected bills is that of one thousand yen.

The general machine then outputs the bill retrieval command to the bill supplying/retrieving means 4 and drives it to retrieve the bills, while outputting to the transaction machine 1 a command to discharge the bills to the bill supplying/retrieving means 4. As a result, the bills contained in the bill boxes 17 and 18 of the transaction machine 1, after having being separated by its separating feeder 24 and the type and number having being checked by the bill checker 15, are conveyed through the conveying means 25 of the transaction machine 1 to the conveying means 45 of the bill supplying/retrieving means 4, and are then accommodated in the bill accommodating portion 42 by the stacker 44. The thus-retrieved bills B can be circulated back to a transaction machine which is short of bills B.

When any one of the transaction machines 1 to 3 has insufficient bills, the bill supplying/retrieving means 4 is positioned to the relevant transaction machine, and is then instructed to supply bills while the relevant transaction machine is instructed to receive bills. As a result, the required number of bills B contained in the bill supplying/retrieving means 4 are separated by its separating feeder 43 and are supplied to the conveying means 25 of the relevent transaction machine through the conveying means 45. The bills are then sent to the bill checker 15 directly so that the type and the number thereof are checked without being passed through the pre-stacker 22, and are accommodated in the bill boxes 17 and 18, thereby completing the supply of bills to the transaction machine.

If bills are conveyed in double during supply to a transaction machine, they are detected by the double-bill detector 100, and are directly returned to the conveying means 45 through the conveying means 25 of the transaction machine and accommodated in the reject box 200. It is clear that, if a conveying passage for the rejected bills is provided in the bill supplying/retrieving means 4, the rejected bills need not be passed through the conveying means 25. If the bills are conveyed in double during retrieval from a transaction machine, they are detected by a double-bill detector disposed upstream of the bill checker 15, and are accommodated in the reject box 16. This enables the amount of the bills which have been exchanged between any of the transaction machines and the bill supplying/retrieving means to be accurately defined. The data representing this amount is stored in the general machine, and this can facilitate the settlement of accounts.

The methods of carrying out supply and retrieval operations are now described below. Supply of bill can be conducted when a transaction machine is in operation but its bill handling section 11 is in idle time. Further, in a case where the bill handling section 11 is in operation, the bills to be supplied to the transaction machine are temporarily accommodated in its pre-stacker 22 to wait for the idle time of the bill handling section 11, and then the bills are supplied when the bill handling section 11 becomes in the idle time. Bills are retrieved from a transaction machine when the bill handling section 11 is in the idle time. Thus, according to the present invention, bills can be supplied to and retrieved from a transaction machine without suspending transactions of the relevant transaction machine.

In the invention, as the transaction machine of the transaction system has a pre-stacker and a conveying passage which are independently provide from the bill handling section 11, the bills to be supplied and to be stacked in the pre-stacker, even when a customer is drawing out money from the transaction machine and its bill handling section 11 is in operation. Although it is necessary to wait for the bill handling section 11 to be in idle time before the supply can be completed, in a case where another machine needs to discharge or be supplied with bills before the supply is completed, the bill supplying/retrieving means 4 (hereinafter referred to as a "moving box") can start moving toward the other transaction machine as soon as the temporary bill stacking is completed, thereby enabling a highly efficient operation.

Figure 7:
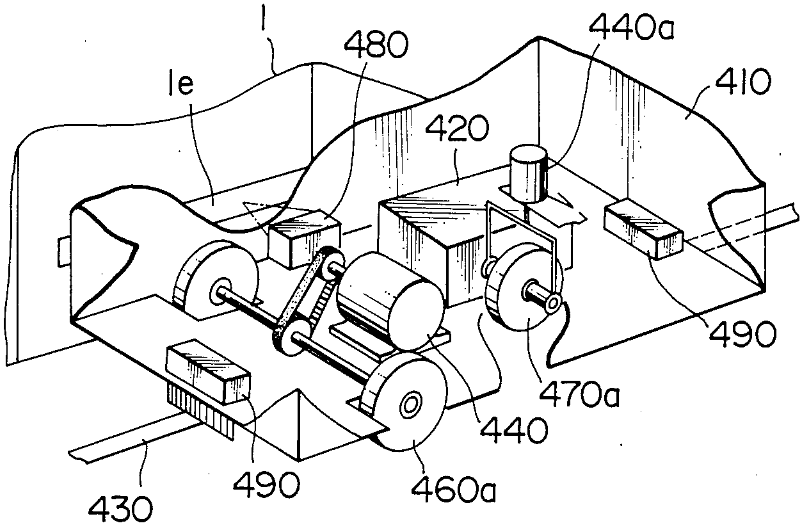
FIG. 7 shows a moving mechanism for the bill supplying/retrieving means employed in the transaction system of FIG. 5.

Construction and operation of the self-propelling means of the moving box 4 will be described. Referring to FIG. 7, the driving portion 410 constituting the self-propelling means is mounted at the lower portion of the moving box 4, and is constructed as follows. Wheels 460a which are connected to a driving motor 440 through a belt are provided at both ends of a rotating shaft. A direction control wheel 470a is provided at the center of the moving box 4 and is directly coupled to a control motor 440a. Optical sensors 490 for detecting a reflection tape 430 indicating a track of the moving box 4 are provided at the front and rear of the moving box 4, while an optical sensor 480 for determining the position of the moving box 4 in a direction perpendicular to that of movement is disposed on a side of the moving box 4. The moving box 4 further includes a module 420 which contains a power source for the motor (rechargeable type) as well as a control circuit.

The moving box 4 is capable of moving back and forth according to the instructions sent from the general machine by detecting the reflection tape 430 with the sensors 490. The moving box 4 is also capable of following an curved track by changing the angle of the wheel 470a to the moving direction of the moving box 4 by the control motor 440a. The transaction machines each have reflection tape 1e, 2e and 3e at position opposite to the sensor 480, so that the port 41 of the moving box 4 can be placed at a predetermined distance from the port 5 of a transaction machine by the sensor 480 when the moving box 4 is connected to the transaction machine.

Figure 8:
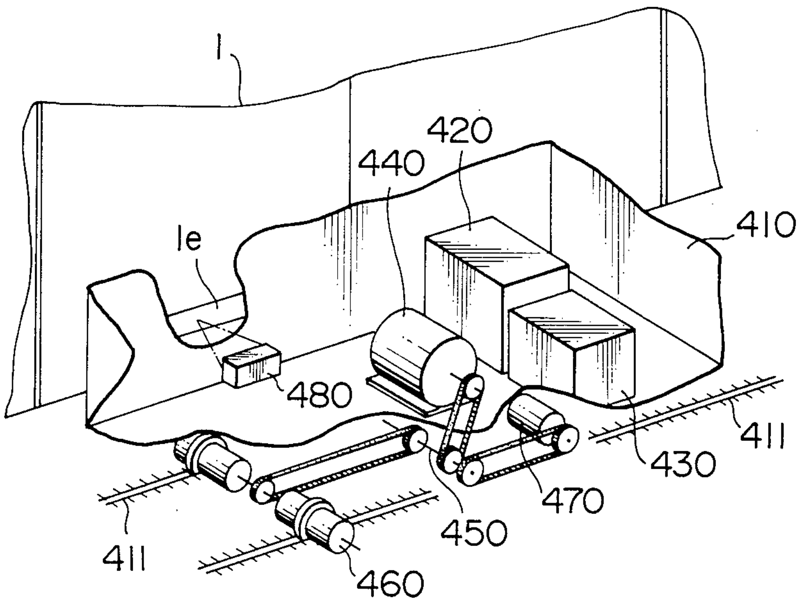
FIG. 8 shows a modification of a moving mechanism for the bill supplying/retrieving means employed in the transaction system of FIG. 5.
Figure 9:
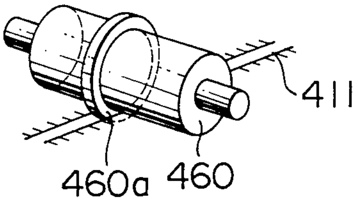
FIG. 9 is a perspective view of a wheel of the moving mechanism of FIG. 8, showing the detailed construction thereof.

FIGS. 8 and 9 shows a modification of the self-propelling means of the moving box 4. The self-propelling means employed is of a linear-motion type, and is therefore suitable for use in supplying and retrieving bills among a plurality of transaction machines. Wheels 460 are mounted at the front of the moving box 4, and parts 460a are engaged with two grooved rails 411 laid on the floor. Cylindrical wheels 470 are provided at the rear of the wheels 460. Both wheels 460 and 470 are connected to a driving motor 440 through a belt. FIG. 9 is an enlarged view of the wheel 460.

Figure 10:
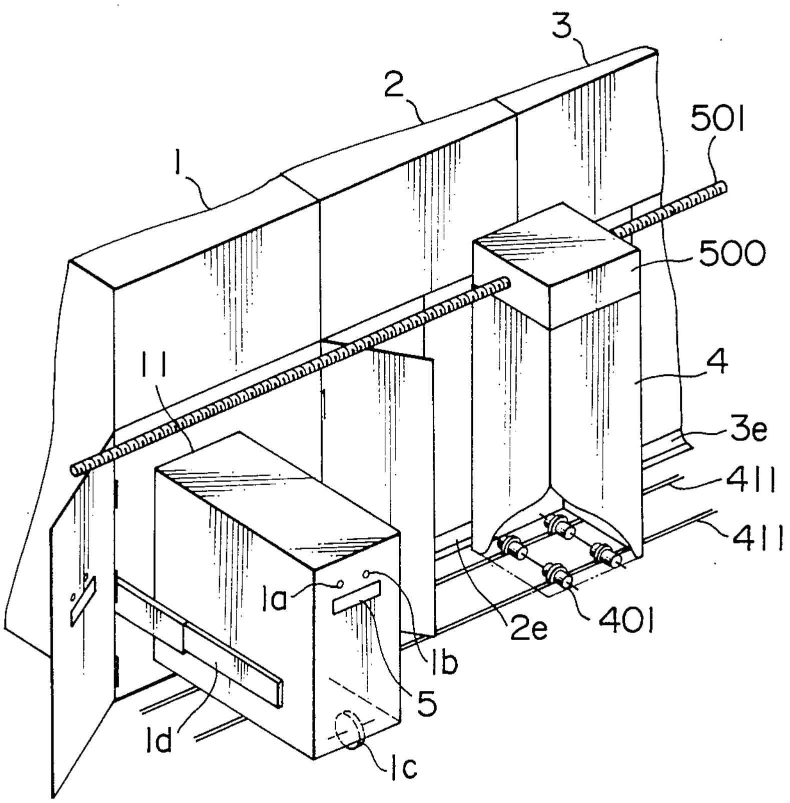
FIGS. 10 and 11 are perspective views of the transaction system of FIG. 5, illustrating the maintenance thereof.

FIG. 10 shows a modification of the moving box which is connected to the transaction machines. The moving box 4 has a driving portion 500 at the upper portion thereof through which a non-rotating lead screw shaft passes. The moving box 4 also has at the lower portion thereof wheels 401 which are engaged with grooved rails 411. The moving box 4 can move along the rear side of the transaction machines with the guidance of the lead screw and the grooved rails 411 so as to supply and retrieve bills among the transaction machines. Since the grooved rails 411 are buried in the floor, the bill handling section 11 can be drawn out as shown in FIG. 10, and the maintenance of the transaction machine from the rear side is thereby facilitated. A slider 1*d* and a roller 1*c* are provided to make the drawing and housing of the bill handling section easier.

Figure 11:
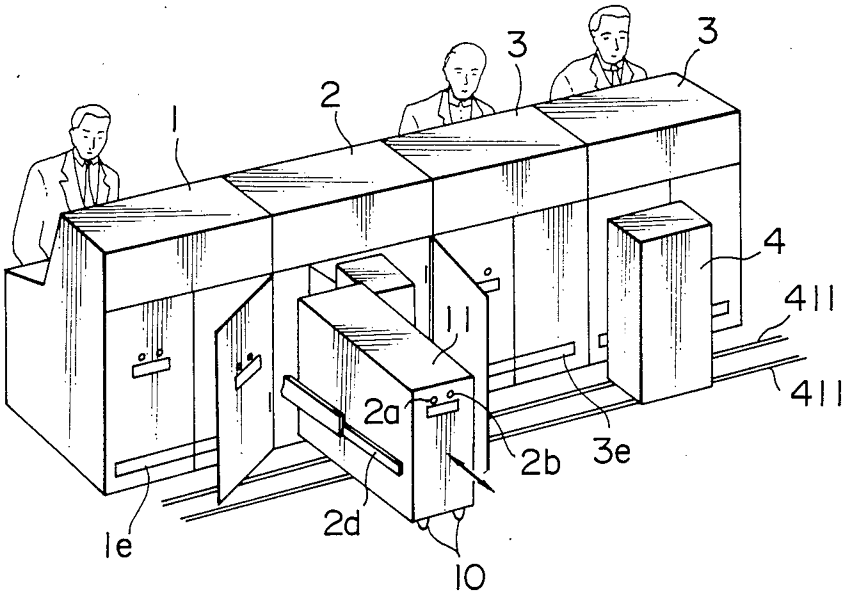

FIG. 11 illustrates the maintenance of the transaction machines with the self-propelling type moving box 4 from the rear side.

By virtue of the fact that bills B are supplied and retrieved in the manner as described above, a plurality of transaction machines can be group controlled, and the efficiency of the use of funds among these transaction machines can be increased. It is also possible to reduce the frequency of occurrence of transaction suspensions by using funds in the manner described above.

In the embodiments described above, the transaction machines employed have the functions of both accepting deposits and paying out money. The present invention can also be applied to a combination of transaction machines of this type and ones capable of either accepting deposits or paying out money.

As is clear from the foregoing description, according to the present invention, it is possible to increase the efficiency in the use of funds among a plurality of transaction machines installed in a cash corner or the like.

Figure 12:
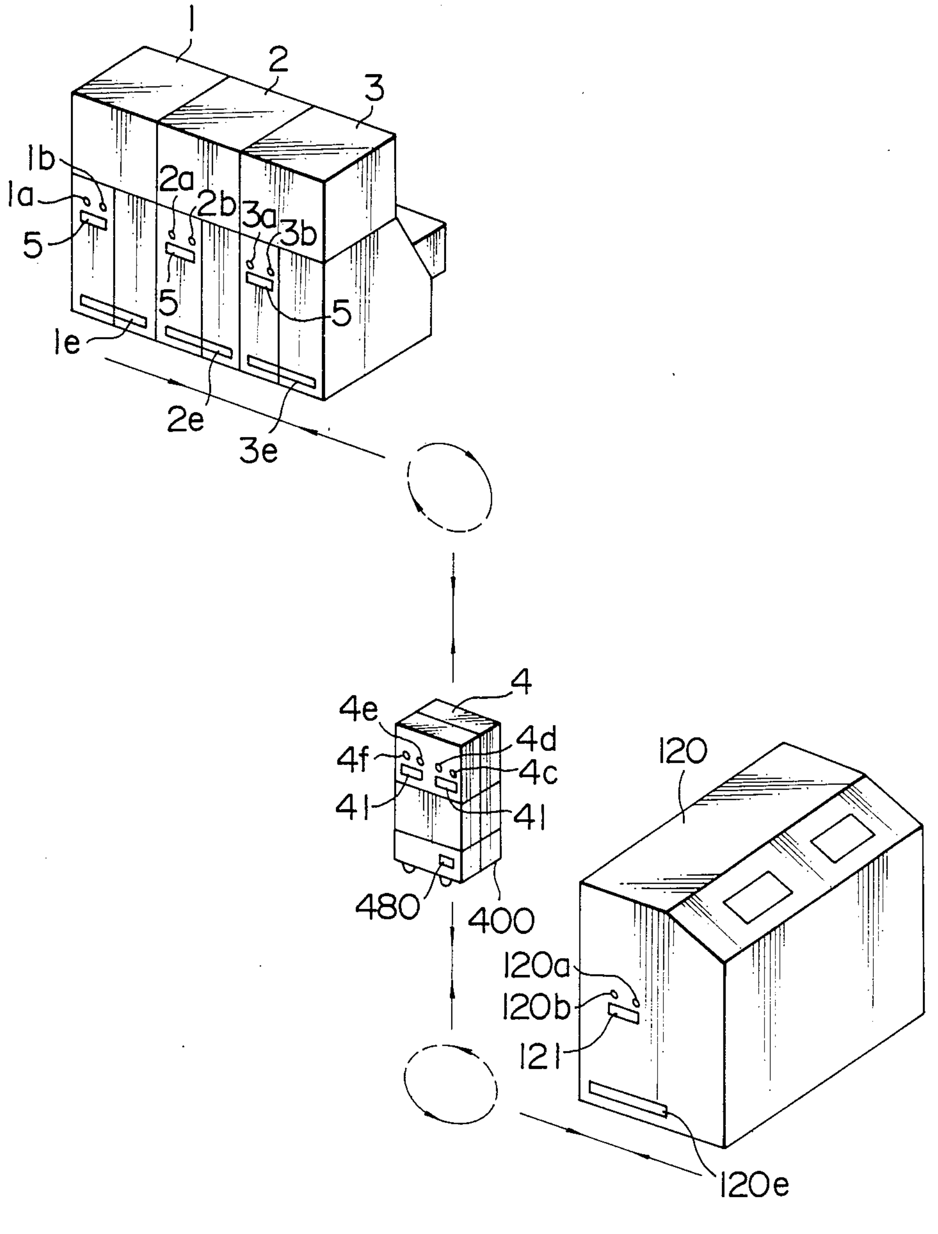
FIG. 12 is a perspective view of a third embodiment of a transaction system according to the present invention.

FIG. 12 shows a third embodiment of the transaction system according to the present invention, in which reference numerals 1 to 3 denote transaction machines arranged side by side; 120 denotes a cash handling device (hereinafter referred to as a "central device") located apart from the transaction machines within the bank; and 4 denotes a bill supplying/retrieving means with a cash transaction handling device (hereinafter referred to as a "moving box"). The machines each have at the side thereof opposite to the port for transactions a port 5 through which bills are conveyed and sensors 1*a*, 1*b*, 2*a*, 2*b* and 3*a*, 3*b* for detecting the stopping position of the moving box 4. The moving box 4 and the central device 120 similarly have ports 41 and 121 and sensors 4*c*, 4*d*, 4*e*, 4*f* and 120*a*, 120*b*, respectively.

The moving box 4 may contain cash boxes for a plurality of types of bills. The moving box 4 shown in FIG. 12 carries cash boxes for two types of bills.

The moving box 4 is capable of travelling by itself by means of self propelling means to be described later so as to move among the machines and between any one of the machines and the central device. The central device controls the system by outputting instructions to supply and retrieve bills among the machines and between the machines and the central device. The port 41 of the moving box 4 which is provided with the sensors 4*c* and 4*d* represents a port through which ten thousand yen bills are conveyed, whereas thousand yen bills are passed through the port 41 provided with the sensors 4*e* and 4*f*.

Figure 13:
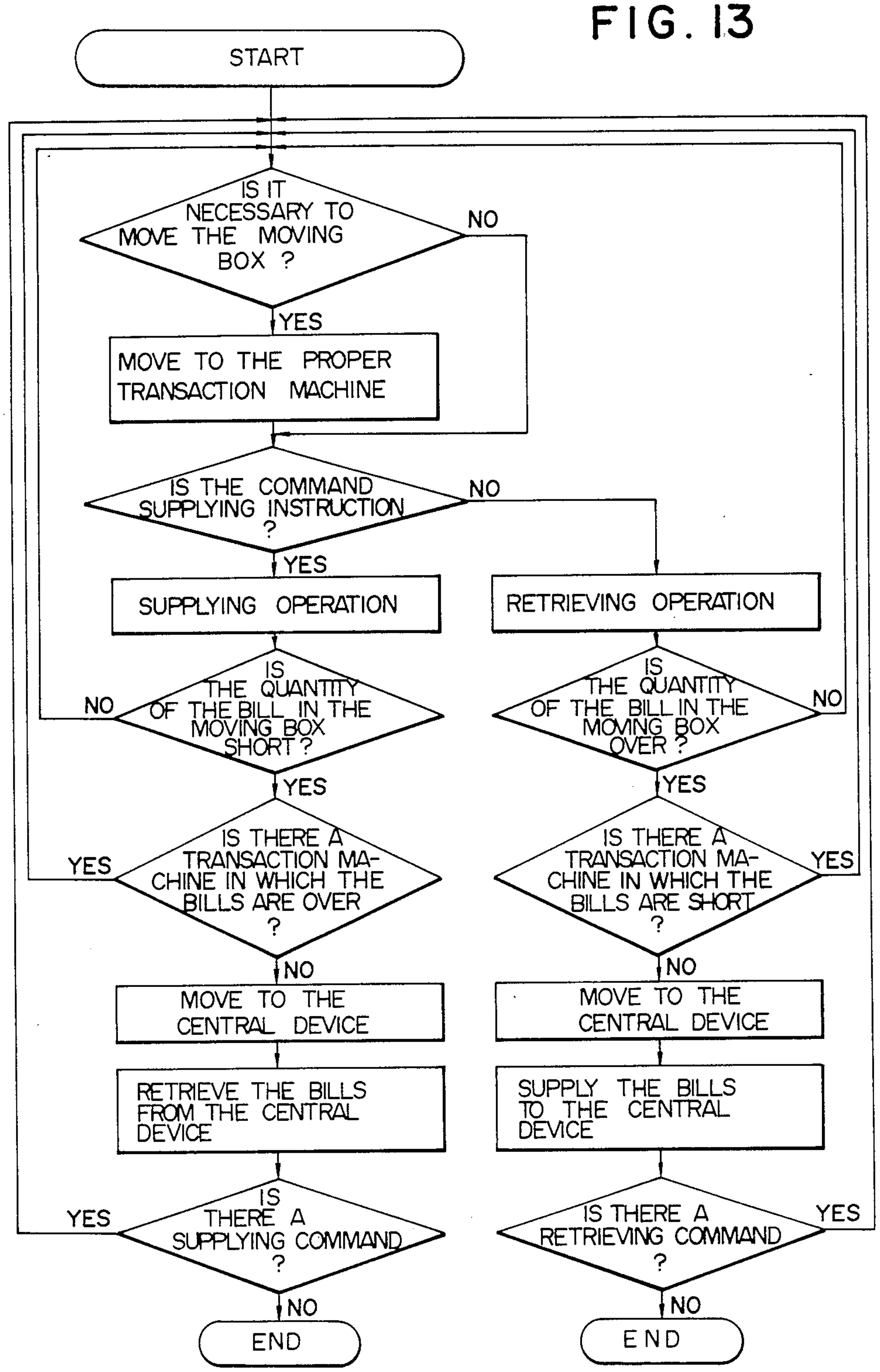
FIG. 13 is a flowchart diagram used to explain the operation of the transaction system of FIG. 12.

Referring to the flowchart diagram shown in FIG. 13, supply and retrieval processes will be described below. The moving box 4 waits for a supply or retrieval instruction in a state wherein it is connected to either any one of the transaction machines or the central device. When an instruction is output from the central device to the moving box 4, the first decision is whether it is necessary to move the moving box 4. If a supply or retrieval operation is requested by the transaction machine 1 while the moving box 4 is connected to the central device 120, for example, the moving box 4 moves to the transaction machine 1 from the central device 120 by the self-propelling means. If the bills to be supplied or retrieved are one thousand yen bills, the moving box 4 stops at a position detected by the sensors 4*e* and 4*f*, while in the case of ten thousand yen bills, the stopping position is detected by the sensors 4*c* and 4*d*. When the moving box 4 has been stopped in the right position, the respective ports 41 and 5 of the moving box 4 and the transaction machine 1 are opposite to each other. It is then decided if the instruction output is for supply or retrieval. If it is a supply instruction, the required number of one thousand yen or ten thousand yen bills are supplied to the transaction machine 1 from the moving box 4. If, when the supplying operation is completed, the moving box 4 has a sufficient amount of residual bills, it waits for the next instruction. If it is judged that the residual bills of the moving box 4 are insufficient, the amount of bills contained in other transaction machine 2 or 3 is checked, and the moving box 4 moves to other transaction machine 2 or 3 which has an excess amount of bills, retrieves a predetermined number of bills therefrom and waits for the next instruction. If none of the transaciion machine 2 and 3 has an excess amount of bills, the moving box 4 moves to the central device 120, and is supplied with a predetermined number of bills therefrom and waits for the next instruction.

The instruction which is outputted from the central device 120 to the moving box 4 may be an instruction for retrieval of bills from the transaction machine 1. In such a case, when retrieval of a predetermined number of one thousand or ten thousand yen bills from the transaction machine 1 is completed, the amount of bills contained in the moving box 4 is checked. If it is determined that the moving box 4 can contain more bills, it waits for the next instruction. If it is decided that the moving box 4 contains an excess amount of bills, the amount of bills contained in other transaction machine 2 or 3 is checked, and the moving box 4 moves to either one of the machines 2 and 3 which contains an insufficient amount of bills to supply a predetermined number of bills thereto and waits for the next instruction. On the other hand, if it is determined that both of the machines 2 and 3 contain sufficient amounts of bills, the moving box 4 moves to the central device 120 to supply a predetermined number of bills thereto and waits for the next instruction.

Since the machines and the moving box are connected and supply and retrieval operations are conducted in the same manner as in the previous embodiments, the details thereof are omitted.

According to this embodiment of the present invention as described above, a plurality of transaction machines can be group controlled, and the efficiency of the use of funds among these transaction machines can be increased. It is also possible to reduce the frequency of occurrence of transaction suspensions by using funds in a manner described above. Funds can be used at a higher efficiency by being circulated among a plurality of transaction machines installed in a cash corner or the like and between any of the transaction machines and the cash handling device located within the bank.

As will be understood from the foregoing description, the present invention makes it possible to increase the efficiency of the use of funds among a plurality of transaction machines installed in a cash corner or the like.

What is claimed is:

1. A transaction system comprising:

a plurality of transaction machines capable of accepting deposits and paying out bills, each of said transaction machines including a pre-stacker for temporarily storing the bills and conveying means for interconnecting between said pre-stacker and a port provided on the rear side of the transaction machine, said conveying means being provided independently of another conveying means for conveying the bills to and from a bill receiving and paying port provided at the front side of the transaction machine, bill supplying/retrieving means for supplying and retrieving bills to and from said transaction machines, said bill supplying/retrieving means being movable by means of a driving device, and control means for controlling said bill supplying/retrieving means in accordance with operations of said transaction machines.

2. A transaction system according to claim 1, wherein said bill supplying/retrieving means is movable along a rear side of said plurality of transaction machines and includes a bill accommodating portion, a separator for separating the bills accommodated in said accommodating portion, an accumulator for accommodating bills into said accommodating portion, a port which positionally corresponds with a port on the rear side of each of said transaction machines, and conveying means for connecting said separator and said accumulator.

3. A transaction system according to claim 1, wherein said bill supplying/retrieving means has accommodating portions from and to which a plurality of different types of bills are respectively supplied and retrieved.

4. A transaction system according to claim 1, wherein said bill supplying/retrieving means is moved to a desired transaction machine by a target position command output from one of said plurality of transaction machines which acts as a parent transaction machine.

5. A transaction system comprising:

a plurality of transaction machines capable of accepting deposits and paying out bills, bill supplying/retrieving means for supplying and retrieving bills to and from said transaction machines, said bill supplying/retrieving means being movable by means of a driving device and including a detector for detecting bills which have been simultaneously conveyed during a supply operation and a reject box for accommodating the bills which have been simultaneously conveyed during supply and retrieving operations, and control means for controlling said bill supplying/retrieving means in accordance with operations of said transaction machines.

6. A transaction system according to claim 5, wherein said bill supplying/retrieving means is movable along a rear side of said plurality of transaction machines and includes a bill accommodating portion, a separator for separating the bills accommodated in said accommodating portion, an accumulator for accommodating bills into said accommodating portion, a port which meets with a port on the rear side of each of said transaction machines, and conveying means for connecting said operator and said accumulator.

7. A transaction system according to claim 5, wherein said bill supplying/retrieving means has accommodating portions from and to which a plurality of different types of bills are respectively supplied and retrieved.

8. A transaction system according to claim 5, wherein said bill supplying/retrieving means is moved to a desired transaction machine by a target position command output from one of said plurality of transaction machines which acts as a parent transaction machine.

9. A transaction system comprising:

a plurality of transaction machines capable of accepting deposits and paying out bills, each of said transaction machines including a pre-stacker for temporarily storing the bills and conveying means for interconnecting between said pre-stacker and a port provided on a rear side of a transaction machine, said conveying means being provided independently of another conveying means for conveying the bills to and from a bill receiving and paying port provided at a front side of the transaction machine, bill supplying/retrieving means for supplying and retrieving bills to and from said transaction machines, said bill supplying/retrieving means being movable by itself, and an automatic teller machine which supplies and retrieves ills to and from said bill supplying/retrieving means.

10. A transaction system according to claim 9, wherein said bill supplying/retrieving means includes drive means for moving said bill supplying/retrieving means along the rear side of said plurality of transaction machines as well as to said automated teller machine, a bill accommodating portion, a separator for separating the bills accommodated in said accommodating portion, an accumulator for accommodating bills into said accommodating portion, a port which positionally corresponds with a port on the rear side of each of said transaction machines, and conveying means for connecting said separator and said accumulator.

11. A transaction system according to claim 9, wherein said bill supplying/retrieving means has accommodating portions from and to which a plurality of different types of bills are respectively supplied and retrieved.

12. A transaction system according to claim 9, wherein said bill supplying/retrieving means is moved to a desired transaction machine by a target position command output from one of said plurality of transaction machines which acts as a parent transaction machine.

* * * * *